Dec. 14, 1948.  E. SEIFERT  2,456,025

MECHANICAL FILTER

Filed May 10, 1946

INVENTOR.
EMMETT SEIFERT
BY
ATTORNEYS

Patented Dec. 14, 1948

2,456,025

UNITED STATES PATENT OFFICE 2,456,025

MECHANICAL FILTER

Emmett Seifert, San Gabriel, Calif.

Application May 10, 1946, Serial No. 668,655

6 Claims. (Cl. 210—165)

My invention relates to an improved mechanical filter wherein the commonly used absorbent and/or foraminous filtering element requiring periodic replacement is replaced by a permanent group of concentric nested sleeves so that the particles and sediment entrained in the liquid forced under pressure upwardly between the rings are mechanically stripped from the liquid and permitted to subside by gravity and be trapped out of the liquid stream, and the primary object of my invention is to provide a simple and efficient device of this character, which may be installed in existing filter casings to replace conventional filter elements of the types alluded to above, or be provided with a filter casing of its own to act as a filtering unit.

Another important object of my invention is to provide a filter of the character indicated above which is especially, although not necessarily, adapted for use with internal combustion engines for filtering the liquid such as lubricating oil and gasoline or Diesel fuel oil used therein, and which is capable of ready modification in the proportionment and relative arrangement of its parts for the most efficient filtering action with respect to any of such liquids.

Other important objects and advantages of my invention will be apparent from the following description and accompanying drawings, wherein for illustration a non-limitative example of my invention is set forth in detail.

Figure 1:
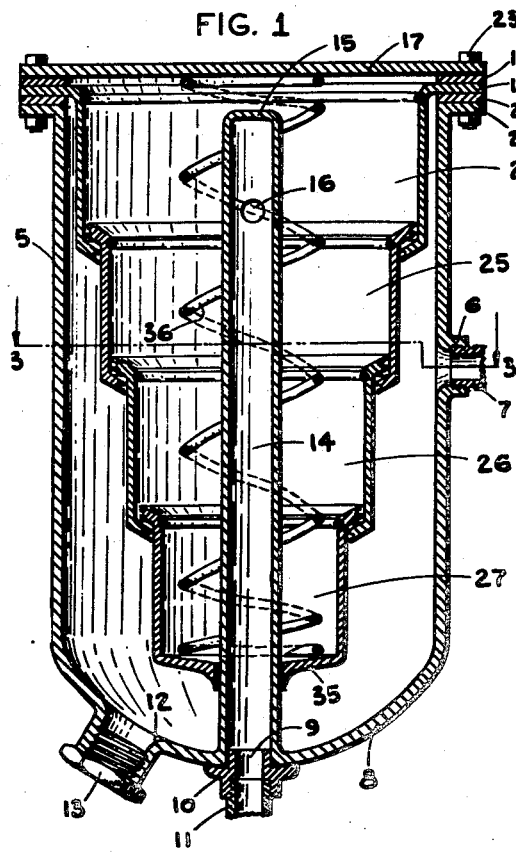
Figure 1 is a general central vertical transverse section taken through said embodiment, showing the uncollapsed or uncompressed position of the sleeves.

Referring in detail to the drawings, the numeral 5 generally designates the generally cylindrical rounded bottom filter casing provided in one side, with a radial oil inlet 6 located about midway between the upper and lower ends of the casing, and adapted to be connected to a pressure pipe 7, which in the case of an engine oil filter leads from the pressure lubrication system of the engine or from the pressure fuel feed thereof.

The rounded bottom 8 has a central outlet 9 including a coupling 10 for connecting to a liquid return pipe 11. At one side the bottom has a drain and cleanout opening 12 closed by a removal plug 13.

An axial downflow tube 14 closed at its upper end at 15 is fixed to rise around the outlet 9 from the casing bottom to a point adjacent to the upper end of the casing. A single port 16 is provided in the side wall of the tube 14 near the upper end.

The upper end of the casing is closed by a circular plate 17 whose marginal portion rests upon an annular gasket 18 which is seated on the lateral flange 19 of the uppermost stripping sleeve or ring 20, said flange resting in turn upon an annular gasket 21 on the casing flange 22. Bolts 23 traverse and clamp together the above-described flanges and gaskets to pressure seal the casing 5.

The major portion of the outer or uppermost sleeve or ring 20 is substantially cylindrical as are all of the sleeves or rings, which in this particular case number four. A greater or less number of sleeves may be used when desirable or necessary.

Figure 2:
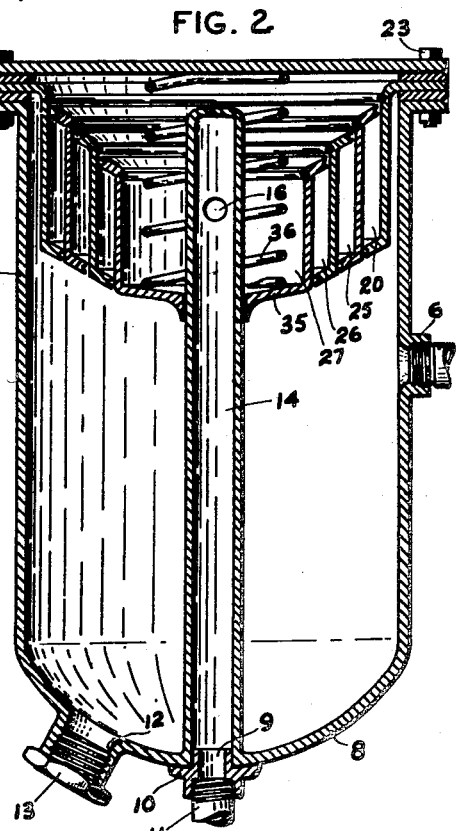
Figure 2 is a similar view showing the sleeves compressed or collapsed into filtering or stripping position by the pressure of oil entering the filter.
Figure 3:
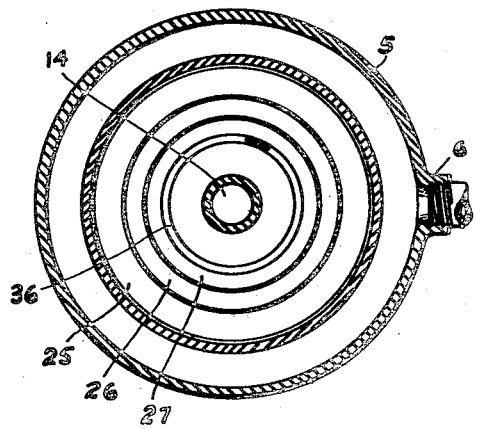
Figure 3 is a horizontal section on the line 3—3 of Figure 1.
Figure 4:
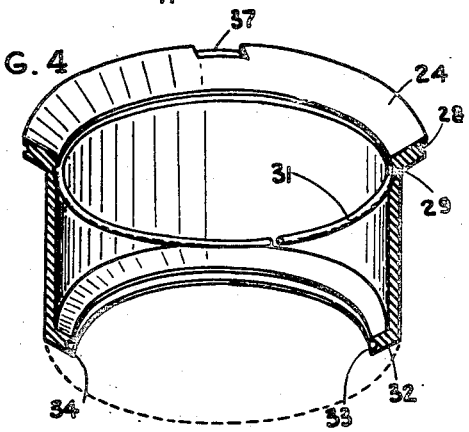
Figure 4 is a perspective view, partly broken away, to show the arrangement of the oil grooves and an assembling snap ring.

In the instance of the uppermost sleeve 20 the upper annular flange 19 is plane and projects at right angles, whereas the upper annular flanges 24 of the lower or inner rings or sleeves 25, 26, 27, respectively, project outwardly at a slight upward angle and have an outer annular oil groove 28 and an inner annular snap ring groove 29, as shown in Figure 4. A notch 37 cut in the top of the flange 24 provides free passage of oil between adjacent close fitting portions of the sleeves. Each sleeve has seated in its groove 29 an outwardly tensioned snap ring 31 which acts as a stop for the flange of the next inner sleeve in the completely compressed position of the sleeves illustrated in Figure 2 to limit further upward relative movement thereof. This form of stop means can be easily removed for assembling or disassembling the sleeves.

The outer edges of the upper flanges 24 in which the grooves 28 are located fit close to the inner surface of the cylindrical part of the next outer ring and are filtering or stripping surfaces. Similarly, the outer edges of the lower and declining annular flanges 32 are filtering or stripping surfaces and fit close to the outer surface of the cylindrical part of the next inner or lower ring; and the said surfaces are provided with oil grooves 33. The oil grooves 28 and 33 trap oil passing between the sleeves which increases the stripping action. It will be noted that the radially outward terminals of the flanges 24 and 32 present sharp scraping or stripping edges 34.

The innermost or lowermost ring or sleeve 27 has a bottom 35 instead of an abbreviated annular flange 32, which has a central opening having a close sliding fit on the downflow tube 14.

A helical expanding spring 36 is spacedly circumposed around the tube 14 and is confined between the bottom 35 of the lowermost sleeve 27 and the top plate 17 of the casing, so that when the filter is not operating under pressure, the sleeves are moved into the expanded position shown in Figure 1.

However, when the oil or other liquid to be filtered passes the inlet opening 6 under pressure and fills the interior of the casing around the nested sleeves, the sleeves are forced to collapse upwardly to the degree determined by the strength of the spring 36 and the resistance offered by the grooved sleeve flanges and adjacent sides of the sleeves to passage of the oil therebetween. Under normal liquid pressure conditions the sleeves will be forced upwardly to their limits so that the spaces between the grooved stripping flanges and their sharp edges 34 and sleeve sides are at a minimum and the stripping action is greatest, as the oil or other liquid passes through the said spaces on its way to the outlet pipe 11 via the port 16 and the downflow tube 14. The upward travel of the oil between and along the sleeves permits the stripped out dirt and particles in the oil or other liquid to settle out gravitationally and fall to the bottom 8 of the casing and accumulate there for periodic removal through the drain opening 12, no other servicing of my filter being ordinarily necessary. The notches 37 cut at intervals in the tops and through the sides of the upper flanges 24 provide freer passage of the oil by the snap rings 31 especially during the occurrence of heavier oil pressures, and preclude binding and "chattering" or vibratory action of the oil sleeves.

I claim:

1. A mechanical filter for oil or other liquid under pressure, comprising a closed casing provided with a lateral oil inlet and a centralized filtered oil outlet in its bottom, a closed top downflow tube connected at its lower end to said outlet, said downflow tube rising substantially above the level of said inlet and provided with a lateral port near its upper end above said inlet, and a plurality of telescopically arranged sleeves concentrically surrounding said downflow tube, adjacent ones of said sleeves having peripheral portions closely spaced from each other and between which the oil entering said casing is forced to pass upwardly to enter said port and flow downwardly through said downflow tube to said outlet said sleeves being forced upwardly into telescoped relation in the top of the closed casing by the pressure of oil in the casing.

2. A mechanical filter for oil or other liquid under pressure comprising a closed vertical casing provided with an oil inlet below its upper end and a filtered oil outlet in its bottom, an axial downflow tube having its lower end connected to said outlet, said downflow tube being closed at its upper end and provided with a port located above the level of said oil inlet, a plurality of telescoped stripping sleeves concentrically surrounding said downflow tube, the innermost sleeve having a closed bottom apertured to slidably fit said downflow tube and the outermost sleeve being fixed to the upper part of said casing, at least one intermediate sleeve having an inwardly projecting annular stripping flange on the lower end thereof having a stripping surface slidably fitting the exterior of said innermost sleeve and an outwardly projecting annular stripping flange on its upper end having a stripping surface slidably fitting the interior of said outermost sleeve above the lower inwardly projecting stripping flange thereof, the entrance of the oil under pressure into said casing outside of said sleeves acting to force said innermost and intermediate sleeves upwardly so as to further telescope the sleeves, means for limiting the upward telescoping travel of the sleeves relative to each other and to said outermost sleeve.

3. A mechanical filter for oil or other liquid under pressure comprising a closed vertical casing provided with an oil inlet below its upper end and a filtered oil outlet in its bottom, an axial downflow tube having its lower end connected to said outlet, said downflow tube being closed at its upper end and provided with a port located above the level of said oil inlet, a plurality of telescoped stripping sleeves concentrically surrounding said downflow tube, the innermost sleeve having a closed bottom apertured to slidably fit said downflow tube and the outermost sleeve being fixed to the upper part of said casing, at least one intermediate sleeve having an inwardly projecting annular stripping flange on the lower end thereof having a stripping surface slidably fitting the exterior of said innermost sleeve and an outwardly projecting annular stripping flange on its upper end having a stripping surface slidably fitting the interior of a next outer sleeve, with the upper stripping flange of one intermediate sleeve slidably fitting the interior of said outermost sleeve above the lower inwardly projecting stripping flange thereof, the entrance of the oil under pressure into said casing outside of said sleeves acting to force said innermost and intermediate sleeves upwardly so as to further telescope the sleeves, means for limiting the upward telescoping travel of the sleeves relative to each other and to said outermost sleeve, a helical expansion spring surrounding said downflow tube and compressed between the top of said casing and the said bottom of the innermost sleeve for resisting upwardly telescoping movement of the sleeves.

4. A mechanical filter for oil or other liquid under pressure comprising a closed vertical casing provided with an oil inlet below its upper end and a filtered oil outlet in its bottom, an axial downflow tube having its lower end connected to said outlet, said downflow tube being closed at its upper end and provided with a port located above the level of said oil inlet, a plurality of telescoped stripping sleeves concentrically surrounding said downflow tube, the innermost sleeve having a closed bottom apertured to slidably fit said downflow tube and the outermost sleeve being fixed to the upper part of said casing, at least one intermediate sleeve having an inwardly projecting annular stripping flange on the lower end thereof having a stripping surface slidably fitting the exterior of said innermost sleeve and an outwardly projecting annular stripping flange on its upper end having a stripping surface slidably fitting the interior of a next outer sleeve, with the upper stripping flange of one intermediate sleeve slidably fitting the interior of said outermost sleeve above the lower inwardly projecting stripping flange thereof, the entrance of the oil under pressure into said casing outside of said sleeves acting to force said innermost and intermediate sleeves upwardly so as to further telescope the sleeves, means for limiting the upward telescoping travel of the sleeves relative to each other and to said outermost sleeve, said limiting means comprising spring rings seated in grooves formed in the interiors of the sleeves, said rings projecting radially inwardly for engagement by the upper stripping flanges of corresponding adjacent sleeves.

5. A mechanical filter for oil or other liquid under pressure comprising a closed vertical casing provided with an oil inlet below its upper end and a filtered oil outlet in its bottom, an axial downflow tube having its lower end connected to said outlet, said downflow tube being closed at its upper end and provided with a port located above the level of said oil inlet, a plurality of telescoped stripping sleeves concentrically surrounding said downflow tube, the innermost sleeve having a closed bottom apertured to slidably fit said downflow tube and the outermost sleeve being fixed to the upper part of said casing, at least one intermediate sleeve having an inwardly projecting annular stripping flange on the lower end thereof having a stripping surface slidably fitting the exterior of said innermost sleeve and an outwardly projecting annular stripping flange on its upper end having a stripping surface slidably fitting the interior of a next outer sleeve, with the upper stripping flange of one intermediate sleeve slidably fitting the interior of said outermost sleeve above the lower inwardly projecting stripping flange thereof, the entrance of the oil under pressure into said sleeves acting to force said innermost and intermediate sleeves upwardly so as to further telescope the sleeves, means for limiting the upward telescoping travel of the sleeves relative to each other and to said outermost sleeve, said stripping surfaces being formed with annular oil grooves for increasing the stripping action of said surfaces upon oil passing upwardly between said surfaces and the interior of the next outer sleeve.

6. A mechanical filter for oil or other liquid under pressure, comprising a closed vertical casing provided with a lateral oil inlet below its upper end, a plurality of vertically telescoping sleeves arranged substantially concentrically in said casing, the outermost sleeve being fixed to the upper part of said casing and the innermost sleeve being closed at its bottom whereby said casing is divided into an inner chamber and an outer chamber, with said inlet opening into said outer chamber, adjacent ones of said sleeves having peripheral portions closely spaced from each other and between which the oil entering said outer chamber under pressure is forced to pass upwardly whereby particles in the oil are stripped therefrom and permitted to subside gravitationally, and outlet means communicating with the upper part of said inner chamber for evacuating filtered oil from said casing said sleeves being forced upwardly into telescoped relation in the top of the closed casing by the pressure of oil in the casing.

EMMETT SEIFERT.

REFERENCES CITED

The following references are of record in the file of this patent:

UNITED STATES PATENTS

| Number | Name | Date |
|---|---|---|
| 723,238 | Burns | Mar. 24, 1903 |
| 2,076,935 | Burckhalter | Apr. 13, 1937 |

FOREIGN PATENTS

| Number | Country | Date |
|---|---|---|
| 320,294 | Germany | Apr. 19, 1920 |